United States Patent [19]

Matysek

[11] Patent Number: 5,363,175
[45] Date of Patent: Nov. 8, 1994

[54] DISTRIBUTED JOB SCHEDULING WITH MODULAR COMPONENTS

[75] Inventor: James F. Matysek, Fairport, N.Y.

[73] Assignee: Xerox Corporation, Stamford, Conn.

[21] Appl. No.: 24,047

[22] Filed: Mar. 1, 1993

[51] Int. Cl.⁵ .......................................... G03G 21/00
[52] U.S. Cl. ..................... 355/208; 355/206; 355/313
[58] Field of Search ............... 355/203, 204, 208, 205, 355/207, 313, 314, 321, 322, 323, 324

[56] References Cited

U.S. PATENT DOCUMENTS

| | | | |
|---|---|---|---|
| 4,120,034 | 10/1978 | Fisk et al. | 355/208 X |
| 4,603,971 | 8/1986 | Kukucka et al. | 355/224 X |
| 5,086,309 | 2/1992 | Iida et al. | 355/223 X |
| 5,095,369 | 3/1992 | Ortiz et al. | 355/324 X |
| 5,164,769 | 11/1992 | Hashimoto et al. | 355/323 |
| 5,184,185 | 2/1993 | Rasmussen et al. | 355/308 |
| 5,221,973 | 6/1993 | Miller et al. | 355/205 X |

*Primary Examiner*—A. T. Grimley
*Assistant Examiner*—Nestor R. Ramirez
*Attorney, Agent, or Firm*—Ronald F. Chapuran

[57] ABSTRACT

A plurality of image processing resources including a finishing station provides an image on a copy sheet during a given cyclical time period and a controller sequencer electrically interconnected to each of the resources directs the operation of the image processing resources, wherein the sequencer provides concurrent ready request signals to each of the resources including the finishing stations, each of the resources provide ready or not ready response signals to the sequencer, and dependent upon the ready or not ready signals of each of the resources the controller periodically skips cyclical time periods or pitches to allow the resources to synchronously reach a ready state.

4 Claims, 5 Drawing Sheets

DISTRIBUTED JOB SCHEDULING WITH MODULAR COMPONENTS

BACKGROUND OF THE INVENTION

The invention relates to distributed job scheduling, and, in particular, to job scheduling with modular components such as distinct finisher stations.

In order to attach a piece of finishing equipment made for one print engine on another print engine that operates at a different speed, the second print engine's control software must be modified to allow for the finishing equipment's operation at the new speed by adding skipped pitches. For instance, to add the Xerox 5090 machine finisher/binder to the Xerox 4090 machine print engine, a very extensive change to the Xerox 4090 machine print engine control software would be required to allow for interrupting the copy flow with skipped pitches (timing adjustments) for the stitching or binding operations. This change would be required even though the exit height and speed of the 4090 machine print engine is compatible with the 5090 machine finisher entrance height and speed.

Also, in order to attach a finishing device to a copier/printer without modifying the printer control software by adding the ability to skip pitches as needed, the only option available is to add buffer trays in the finishing equipment. The buffer trays would buffer the next set of copy sheets entering the finisher while the finishing operation is continuing on the current set of copy sheets. This method adds cost, complexity, and size unnecessarily to finishing equipment. The current method of scheduling copy paper feeds is not very efficient for customers who may want to link or adapt finishing modules to a variety of copiers/printers.

It is the object of this invention, therefore, to introduce a method of scheduling copy paper feeds in a copier/printer that will allow for easy customer reconfiguration of finishing options in the field with no modifications to the copier/printer control software.

It is another object of the present invention to provide a microprocessor in the copier/printer and in each attached finisher and to provide a high speed serial communication link between the copier/printer and each piece of attached finishing equipment.

Other advantages of the present invention will become apparent as the following description proceeds, and the features characterizing the invention will be pointed out with particularity in the claims annexed to and forming a part of this specification.

SUMMARY OF THE INVENTION

An electronic image processing apparatus having a plurality of image processing resources including a finishing station to provide an image on a copy sheet during a given cyclical time period and a controller sequencer electrically interconnected to each of the resources for directing the operation of the image processing resources, the sequencer providing concurrent ready request signals to each of the resources including the finishing stations, each of the resources providing ready or not ready response signals to the sequencer, whereby dependent upon the ready or not ready signals of each of the resources the controller periodically skips cyclical time periods or pitches to allow the resources to concurrently reach a ready state.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
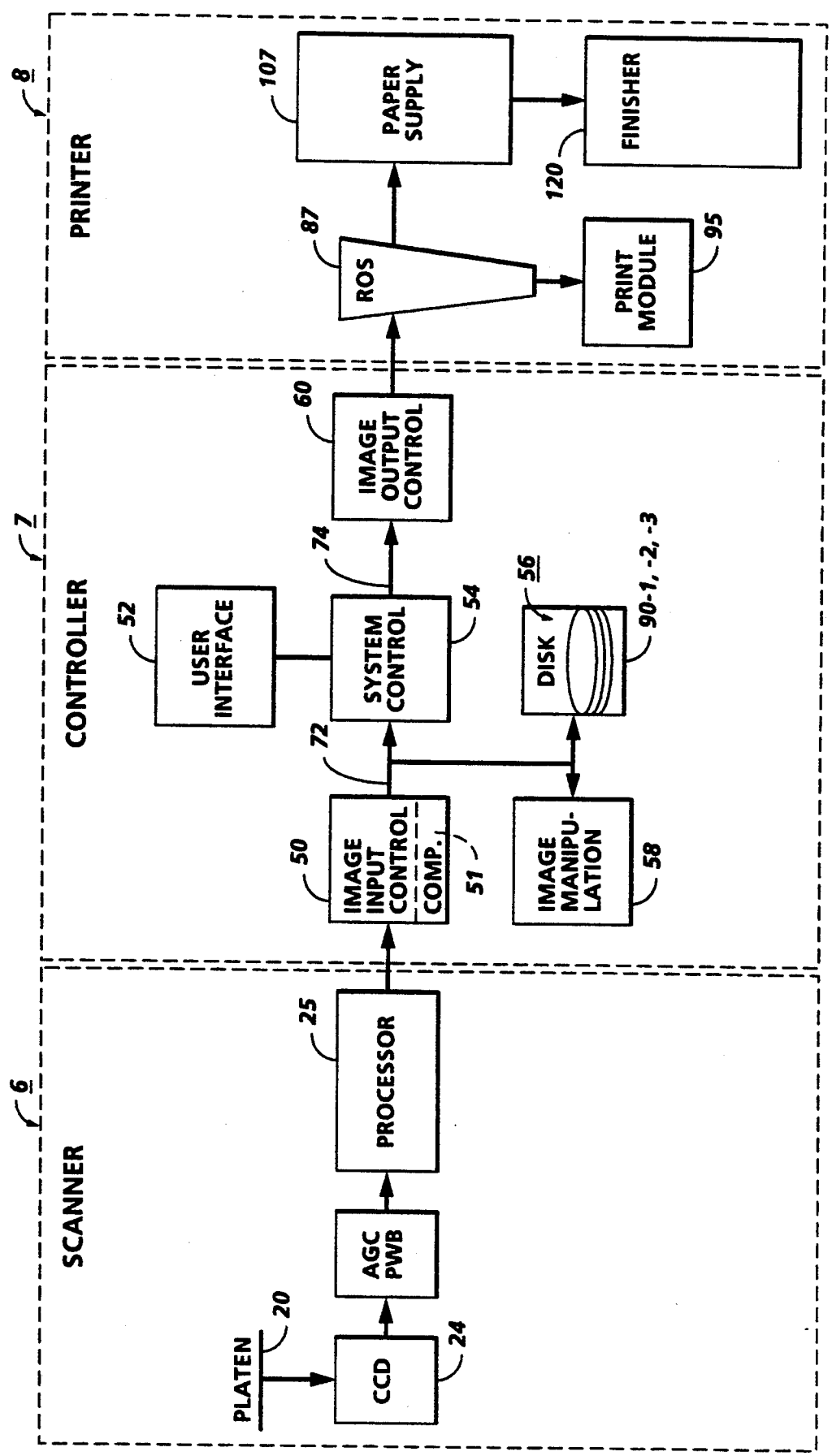
FIG. 1 is a block diagram depicting the major elements of a printing system incorporating the present invention.
Figure 2:
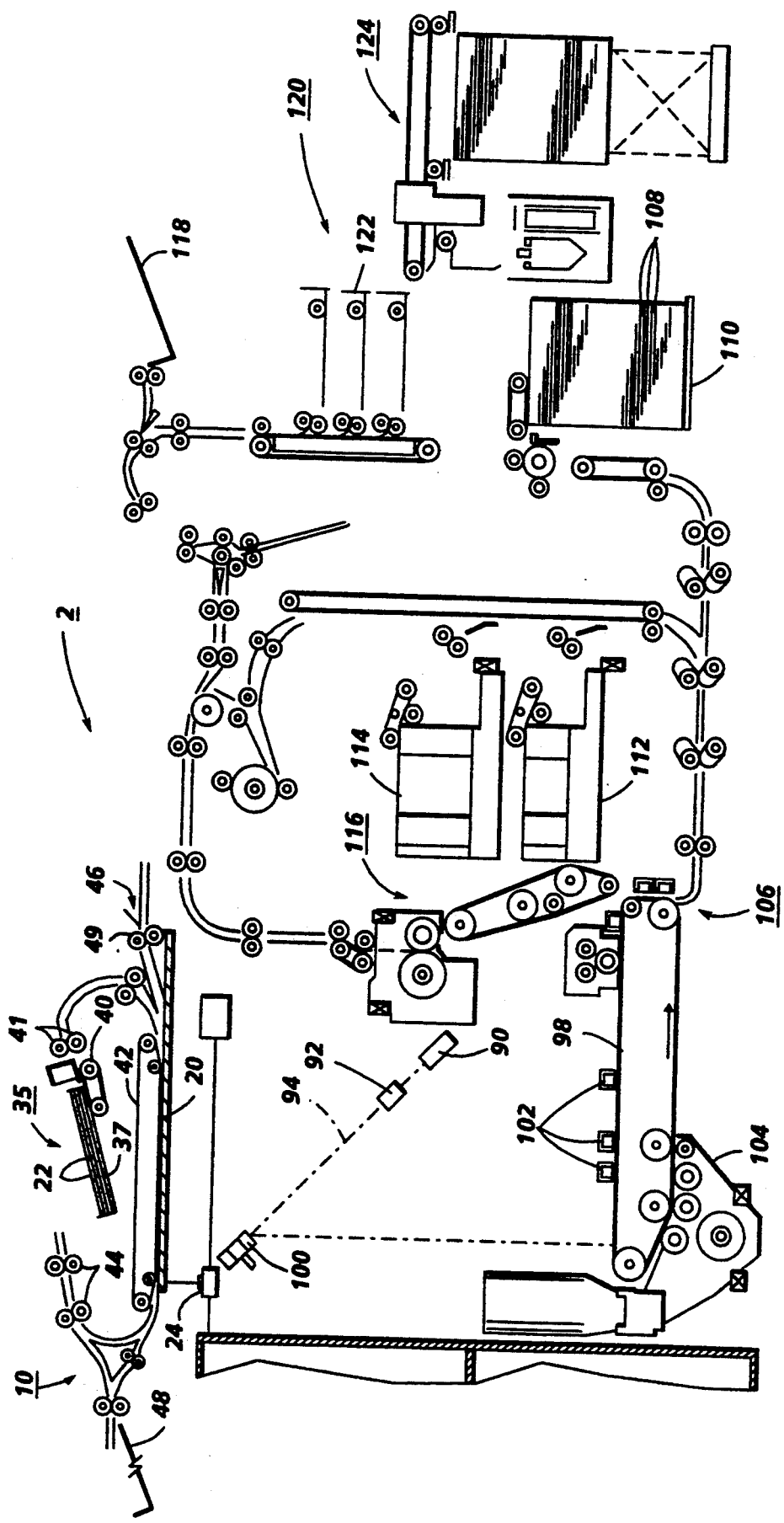
FIG. 2 is a plan view illustrating the principal mechanical components of the printing system of FIG. 1.

Referring to FIGS. 1 and 2, there is shown an exemplary laser based printing system for processing print jobs in accordance with the teachings of the present invention. The printing system 2 for purposes of explanation is divided into a scanner section 6, controller section 7, and printer section 8. While a specific printing system is shown and described, the present invention may be used with other types of printing systems such as ink jet, ionographic, etc.

The scanner section 6 incorporates a transparent platen 20 on which the document to be scanned is located. One or more linear arrays 24 are supported for reciprocating scanning movement below platen 20. As not shown lens and mirrors cooperate to focus array 24 on a line-like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to store and handle the image data in the form required to carry out the job programmed. Processor 25, for example, may provide enhancements and changes to the image signals such as filtering, thresholding, screening, cropping, etc.

Documents to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the manual mode, document handler 35 is pivoted upwardly to expose platen 20. This permits the document 22 to be manually placed on platen 20 following which array 24 is operated to scan the document. When scanning is completed, the document is removed to clear platen 20 for the next document. For Book mode, the book is manually positioned face down on platen 20 with the center line of the book aligned with positioning indicia (not shown) located along the border of platen 20. By programming the system, either one or both of the pages of the book open on the platen are scanned. The process is repeated for different pages of the book until all of the pages desired have been scanned following which the book is removed to clear platen 20.

Printer section 8 comprises a laser type printer and for purposes of explanation is separated into a Raster Output Scanner (ROS) section 87, Print Module Section 95, Paper Supply section 107, and Finisher 120. ROS 95 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotron 102 at a charging station preparatory to exposure by imaging beams 94. The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112 or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Controller section 7 is, for explanation purposes, divided into an image input controller 50, User Interface (U/I) 52, system controller 54, main memory 56, image manipulation section 58 and image output controller 60.

The scanned image data input from processor 25 of scanner section 6 to controller section 7 is compressed by image compressor/processor 51 of image input controller 50. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

User Interface (UI) 52 includes a combined operator controller/CRT display consisting of a not shown interactive touchscreen, keyboard, and mouse. UI 52 interfaces the operator with printing system 2, enabling the operator to program print jobs and other instructions, to obtain system operating information, instructions, programming information, diagnostic information, etc. Items displayed on the touchscreen such as files and icons are actuated by either touching the displayed item on the screen with a finger or by using the mouse to point a cursor to the item selected and keying the mouse.

Main memory 56 in one embodiment has plural hard disks for storing machine Operating System software, machine operating data, and the scanned image data currently being processed. When the compressed image data in main memory 56 requires further processing, or is required for display on the touchscreen of UI 52, or is required by printer section 8, the data is accessed in main memory 56. Where further processing other than that provided by processor 25 is required, the data is transferred to image manipulation section 58 where the additional processing steps such as collation, make ready, decomposition, etc. are carried out. Following processing, the data may be returned to main memory 56, sent to UI 52 for display on the touchscreen or sent to image output controller 60.

Image data output to image output controller 60 is decompressed and readied for printing by image generating processors. Following this, the data is output by dispatch processors to printer section 8. Image data sent to printer section 8 for printing is normally purged from memory 56 to make room for new image data.

Figure 3:
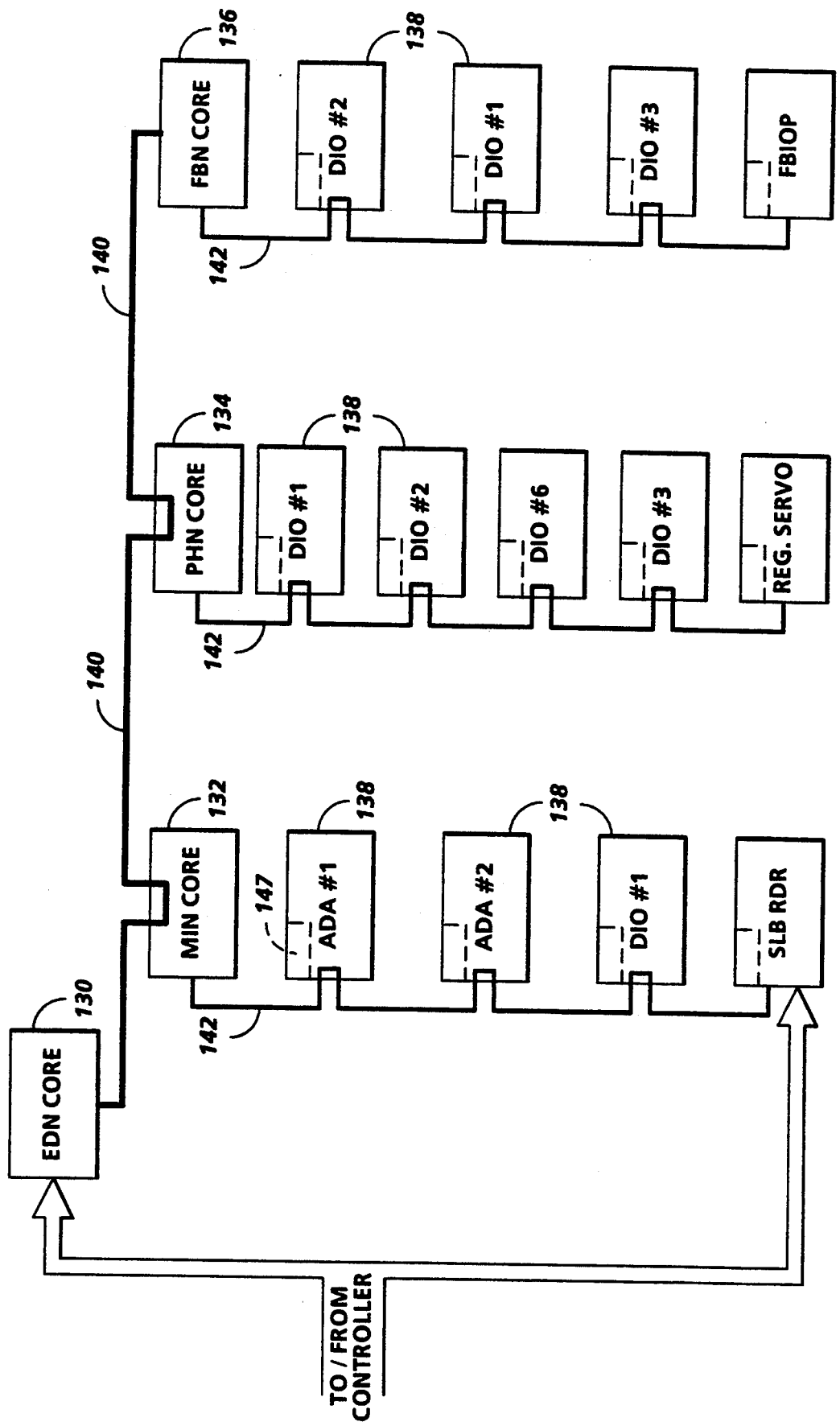
FIG. 3 is a block diagram depicting the Operating System, with Printed Wiring Boards and shared line connections.

Referring particularly to FIG. 3, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

Many copiers and printers are designed as a complete system, including the copy finishing equipment (stitchers, sorters, binders, etc.). Therefore, the job scheduling control algorithms are often completely encapsulated within the base engine (the copier/printer control), including all criteria needed to determine when to skip pitches in the engine to allow for finishing processes to be completed. By definition, a pitch is the basic timing unit or period of the system control.

An example of the need to delay operations or skip pitches is the Xerox 5090 copier/printer with the attached finisher/binder. Embedded in the copier/printer's control software is the control data identifying the number of pitches (at 135 copies per minute) needed for the finisher/binder to stitch a set, bind a set, unload the stacker, and invert a sheet of copy paper. Each of these operations may require a different number of pitches or time periods.

Based on this static information, the copier/printer determines when to interrupt the flow of copy paper with skipped pitches to allow for completion of these finishing tasks with a particular piece of finishing equipment. In the prior art, when a new piece of finishing equipment is to be attached to these copier/printer engines, the copier/printer's control software must be modified to take into account the characteristics of the new finishing equipment. Often, the need for skipped pitches at the current engine's process speed requires a major change to the printer's control software to enable operation with the new finishing equipment.

Figure 4:
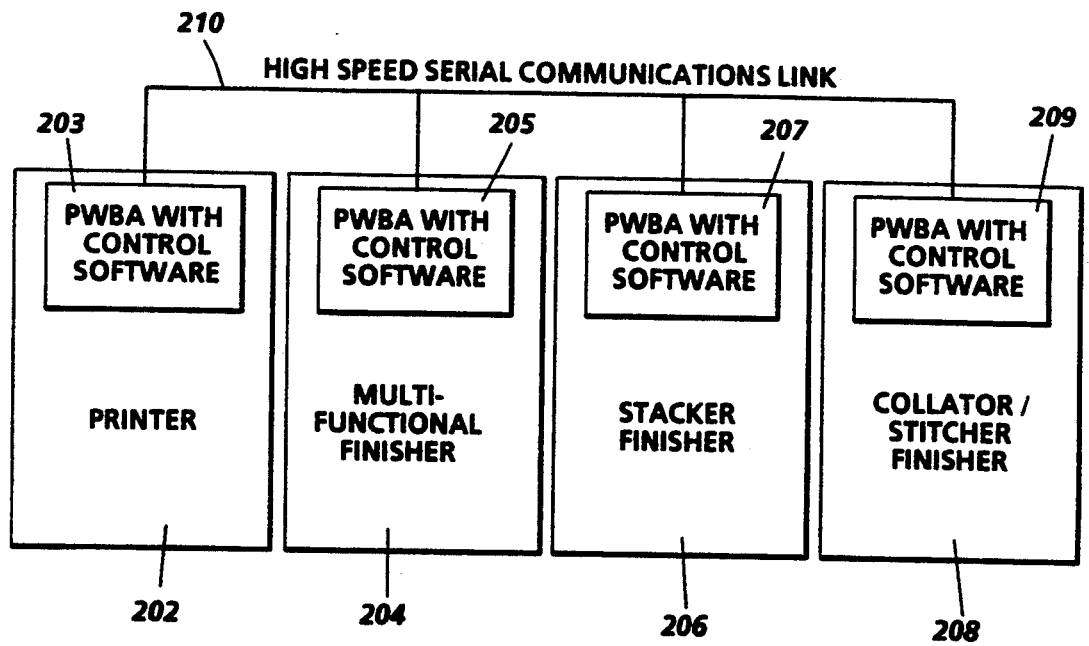
FIG. 4 illustrates a communication link for finishers in accordance with the present invention.

This problem is overcome by the present invention. With reference to FIG. 4, in accordance with the present invention, a print engine 202 with control 203 is illustrated with three hypothetical pieces of finishing equipment attached (finishers 204, 206, and 208) via high speed serial communications bus 210. Finisher 204 with control 205 is a multifunctional finisher that can invert, rotate, perforate, or hole punch individual sheets as they pass through the finisher paper path. Finisher 206 with control 207 is a high capacity sheet stacker with a bypass transport to allow sheets to pass through this finisher without being stacked. Finisher 208 with control 209 is a collator with an optional stitcher and a set stacker. Each finisher is distinct and may have been developed either by various finisher vendors.

To schedule a job in the printing system in accordance with the present invention, printer 202 requests permission from the affected finishers to feed each copy sheet into the paper path. Thus to produce a stitched set of sheets with each sheet perforated at finisher 208, in one embodiment, printer 202 requests and receives permission to feed sheets through finishers 204, 206 and 208 before feeding because the sheet must pass through all three finishers. If permission is granted by all three finishers, a sheet feed can be scheduled, and a second sheet can be requested in the next pitch time, and so on. If permission was denied by any of the three finishers, a skipped pitch is executed instead, and the first sheet will be requested again in the next pitch or machine clock time.

For example, if printer 202 produces copies at a rate of 1 every 444 milliseconds (135 copies per minute), but finisher 204 can only perforate sheets at a rate of 1 every 666 milliseconds (90 copies per minute), finisher 204 would deny permission for the copy feed every other pitch, since the printer would attempt to feed at a rate faster than that finisher can accomplish it's finishing task. The end result would be that the printing system would execute the job at the maximum rate possible with the given configuration of printer and finishers. If finisher 204 were replaced by a new perforator that could run at the 135 CPM rate, the system would automatically run at the new rate because the new finisher would not deny the feed requests.

To run a job to the stacker or finisher 206 in FIG. 1, the printer would only need to request permission to feed from finishers 204 and 206, since finisher 208 is not affected by sheets going to the finisher 206. It should be noted that it is within the scope of the present invention that any configuration of printers can be interconnected. Finishers can be in serial as shown in FIG. 4 or connected to printer 202 individually or in parallel.

This model of distributed job scheduling implies that other configuration information must be communicated between the finishers and the printer. Such other information includes the number of finishers connected, the capabilities of each printer, the length of the paper path in the printer and leading up to each finisher, etc. The information about the paper path length is needed by the finishers since they need to commit to a paper feed N pitches prior to the paper arriving at the finisher where N is the paper path length. The configuration information communicated to the printer is needed to be able to represent the printing system's current capabilities to the user from the printer.

Note that this method of distributed job scheduling is not limited to finishing equipment only, but could also be used for adding paper feeders, document handlers, or xerographic sub-systems for highlight color or for single pass duplex or to any other modular printing systems.

Figure 5:
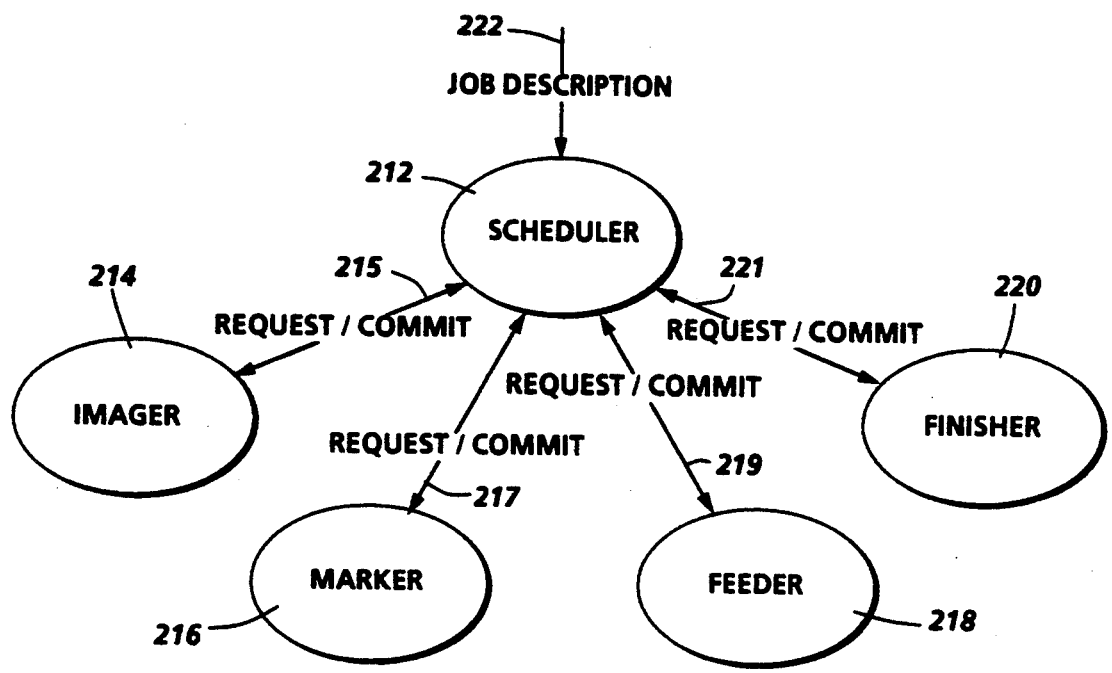
FIG. 5 illustrates a generalized communication link in accordance with the present invention.

With reference to FIG. 5, there is shown a typical generalized distributed job scheduling system including job scheduler 212, imager 214, marker 216, feeder 218, and finisher 220 inter-connected to the scheduler 212 by communication lines 215, 217, 219 and 221 respectively. Each of the two way communication lines 215, 217, 219, and 221 represents continual request communications with the scheduler 212. For example, assume a job description 222 received by the scheduler 212 to provide a copy sheet to the finisher 220 from the feeder 218 of an image developed at marker 216. This requires that each of these components operate as required within a given period of time. If one of the components is unable to commit, the overall operation must be aborted or delayed until another time frame when all of the requested components respond with ready or commit responses to the scheduler 212.

FIG. 5 illustrates a very simplified version of the concept of a request and commit or veto protocol between a scheduler and the various operating components. If all of the components 214, 216, 218, and 220 commit, then the scheduler does schedule the sheet to the finisher. As stated above, if at least one of the components is not able to commit, then the scheduler will insert skipped pitches into the timing of the machine, delaying operation until all necessary components provide a commit response. Much more complicated scheduling is contemplated within the scope of the invention. For example, the scheduling of a color sheet or a duplex sheet requires more complicated scheduling. In addition, such mechanically limiting factors as a needed delay to let a belt seam pass before projecting an image on to a photoreceptor belt would cause further complexities in the scheduling. For this reason it may be desirable to schedule based upon ranges or windows of time rather than simply points in time. As an alternative, each component such as the imager 214, if it is not able to commit at a given time or within a given range of time, could submit a time period when the component could commit to the operation. The scheduler could then balance various projected commit times to schedule an operation.

Figure 6:
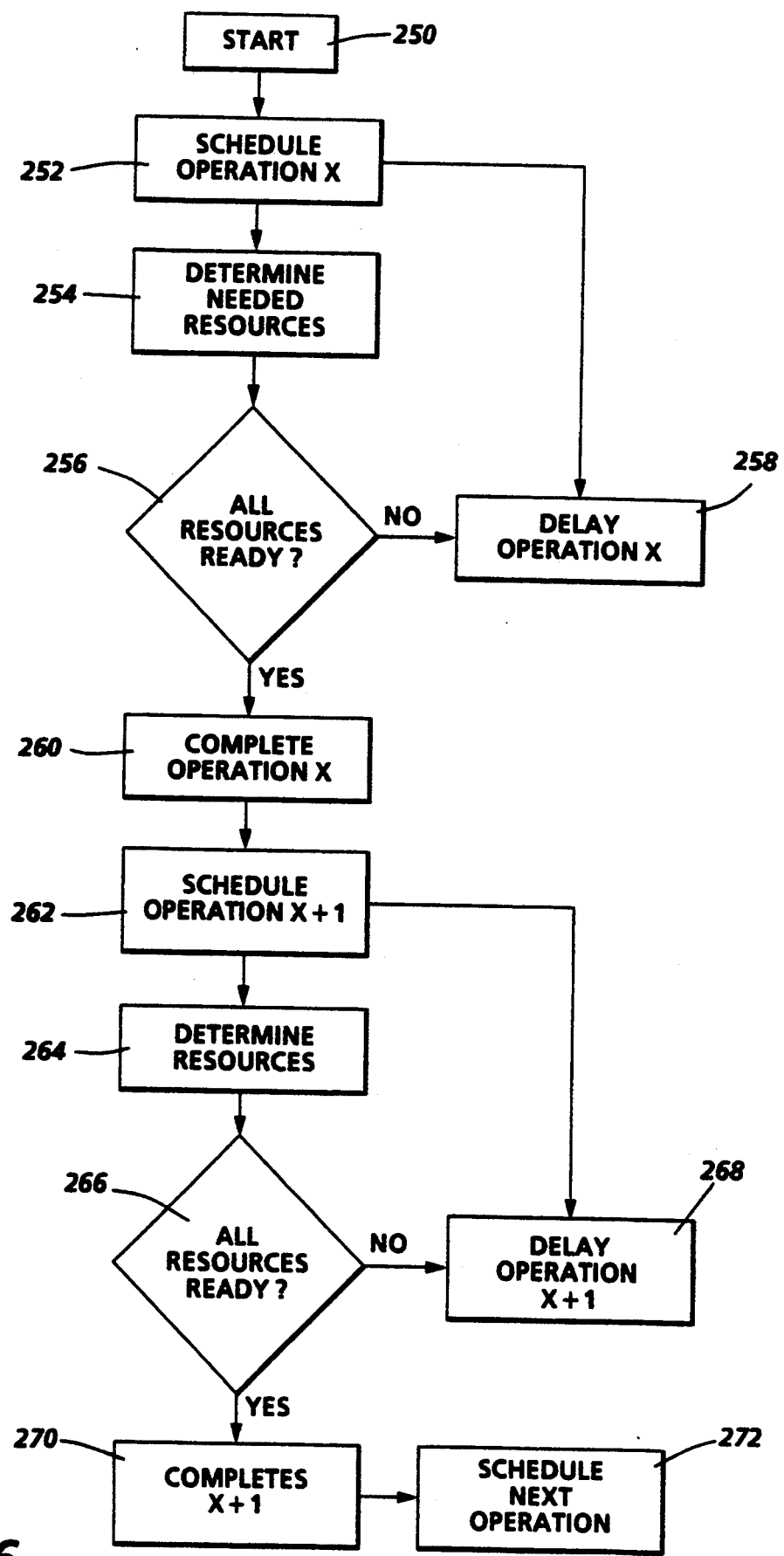
FIG. 6 is a flow chart illustrating distributed job scheduling in accordance with the present invention.

The above sequence is further explained with reference to FIG. 6 illustrating machine start at 250, scheduling operation at 252, determining needed resources at 254, and sending and receiving commit or no commit messages to each of the resources at 256. If at least one of the resources is not ready, there is a delay at the operation as shown at 258 and again operation is scheduled at 252. If all the resources are ready as manifested by commit signals back to the scheduler, then operation is completed as illustrated at 260. The next operation plus I is scheduled at 262, and again there is a determination of the needed resources at 264 and a query and determination as to tile ready status of the resources at the decision block 266. Again, if at least one of the resources is not ready, there is a delay of operation plus 1 at 268 and again operation plus 1 is scheduled at 262. If on the other hand all resources are ready, operation plus 1 is completed at 270 and the next operation scheduled at 272. This sequence is repeated for each operation of the machine until the completion of a particular job.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

I claim:

1. An electronic image processing apparatus having a plurality of image processing resources including image input means, marking means, copy sheet source means, finishing means with multiple components and a controller electrically connected by means of a communication channel to each of the resources for directing the operation of the image processing resources to provide an image on a copy sheet, the apparatus timing being based upon a given repetitive time period, the controller comprising means for initiating status ready requests to a predetermined number of said multiple components over the communication channel for an operation to be executed during a first time period, means for receiving a not ready status signal from at least one of said multiple components over the communication channel, means for skipping said first time period and initiating status ready requests to said multiple component for said operation to be executed during a second time period in response to at least one not ready signal, means for receiving ready status signals from each of said multiple components, and means for executing said operation during the second time period.

2. An electronic image processing apparatus having a plurality of image processing resources comprising image input means, marking means, copy sheet source means, finishing means, and a controller for directing the operation of the image processing resources to provide an image on a copy sheet during a given cyclical time period defined as a pitch, the controller including a sequencer electrically interconnected to each of the resources over a common communication channel, the sequencer providing concurrent ready requests to selected resources, each of the selected resources providing ready or not ready signals to the sequencer, the sequencer including means to repeat the ready requests to each of the selected resources until receipt of ready signals from given resources, and means to produce an image on a copy sheet dependent upon the ready or not ready signals of each of the selected resources.

3. In an electronic image processing apparatus having a plurality of image processing resources including a finisher with multiple components, and a controller electrically connected to each of the multiple components over a communication channel for directing the operation of the image processing resources to provide an image on a copy sheet, the apparatus timing being based upon a given pitch cycle, the method of operating the image processing apparatus comprising the steps of:
  initiating status ready requests by the controller to a predetermined number of said multiple components over the communication channel to feed a copy sheet to the finishing means during a first time period,
  receiving a not ready status signal from at least one of said multiple components over the communication channel,
  the controller skipping said first time period and initiating status ready requests to said multiple components for feeding a copy sheet to the finishing means during a second time period in response to said not ready status signal,
  receiving ready status signals from each of said multiple components, and
  feeding a copy sheet to the finishing means during the second time period.

4. An electronic image processing apparatus having a plurality of image processing resources and a controller electrically connected to each of the resources for directing the operation of the image processing resources to provide an image on a copy sheet, the controller comprising means for initiating status ready requests to a predetermined number of image processing resources for an operation to be executed during a first time period, means for receiving a not ready status signal from one of said predetermined number of image processing resources, means for skipping said first time period and repeating the status ready requests to said predetermined number of image processing resources for said operation to be executed during a second time period until receiving ready status signals from each of said predetermined number of image processing resources, and means for executing said operation during the second time period.

* * * * *